United States Patent [19]

Wheeler

[11] 4,258,737

[45] Mar. 31, 1981

[54] LIQUID LEVEL CONTROLLER

[76] Inventor: Francis J. Wheeler, 29 Somerset Ave., Bernardsville, N.J. 07924

[21] Appl. No.: 16,182

[22] Filed: Feb. 28, 1979

[51] Int. Cl.³ .................. F16K 55/18; F16K 33/00
[52] U.S. Cl. .................. 137/15; 137/315; 137/426; 138/97; 285/15; 285/302
[58] Field of Search ............ 137/15, 315, 317, 426, 137/434, 437, 436, 444; 138/97, 99; 285/15, 302, 342

[56] References Cited

U.S. PATENT DOCUMENTS

| | | | |
|---|---|---|---|
| 796,781 | 8/1905 | Welsh | 138/97 |
| 2,495,352 | 1/1950 | Smith | 138/97 |
| 2,495,532 | 1/1950 | Leonard | 285/302 |
| 2,819,727 | 1/1958 | Levine | 137/444 |
| 2,827,073 | 3/1958 | Owens | 137/437 |
| 3,284,114 | 11/1966 | McCord, Jr. et al. | 285/302 |
| 3,321,924 | 5/1967 | Liddell | 138/97 |
| 3,331,387 | 7/1967 | Walters | 137/444 |
| 3,797,518 | 3/1974 | Holm et al. | 137/442 |
| 4,094,327 | 6/1978 | Brandelli | 137/426 |
| 4,122,862 | 10/1978 | Brandelli | 137/437 |

*Primary Examiner*—Martin P. Schwadron
*Assistant Examiner*—G. L. Walton
*Attorney, Agent, or Firm*—Thomas L. Adams

[57] ABSTRACT

In a tank having an internal float there is a standpipe coupled through the tank. The standpipe conducts liquid into the tank. Equipment for controlling the level of liquid in the tank includes a valve. This valve is operated by the float. A conduit depends from the valve. This conduit is longer than the valve and conducts liquid thereto. Also included is a pliable seal which mounted on the conduit at an end opposite the valve. This seal engages an interior surface of the conduit. The seal also has a bore sized to encircle and seal the standpipe. Thus, the standpipe may telescope into the conduit.

8 Claims, 2 Drawing Figures

LIQUID LEVEL CONTROLLER

BACKGROUND OF THE INVENTION

The well-known ballcock comprises a valve which is actuated by a float. Typically, a ballcock comprises a valve mounted on a standpipe that is coupled through an inlet in a tank. Provided the valve is open, the standpipe conducts water through the valve to fill the tank. The valve is operated by the vertical motion of the float. The valve allows water to flow into the tank and progressively elevate the ball until the ballcock valve is closed.

A disadvantage with conventional ballcock valves is that they are arranged to be mounted at a fixed position on the standpipe. Accordingly, the valve does not easily accomodate different sizes of tanks. In addition, this known valve is arranged so that if it malfunctions the valve and the standpipe are both replaced. Removal of the standpipe is a particularly troublesome task since it requires the loosening of nuts which are in contact with the tank surface and which have been submerged for a considerable period of time. In the case where the tank is the china flush tank of a toilet, removal of the standpipe is complicated by the fact that this china is brittle and easily cracked. Moreover, removal of the standpipe results in a significant waste of brass and copper, a scarce natural resource.

The present invention avoids the foregoing problems by providing a valve which is mounted on a conduit which is sized to fit over a standpipe. The conduit employs a pliable seal so that the height of the valve can be vertically adjusted. In the instance where a conventional ballcock valve is to be replaced, the apparatus disclosed herein allows such replacement without disconnecting the standpipe from the tank. In a disclosed method the standpipe is severed and the new valve is mounted by telescoping its dependent conduit over the severed standpipe.

The apparatus in the preferred embodiment also employs a pliable gasket spaced from and aligned with the above-mentioned pliable seal. Thus, this complimentary arrangement insures structural rigidity while the use of pliable material provides a degree of noise isolation. Accordingly, vibrations associated with gradual closing of the valve are attenuated through the pliable seal and gasket.

SUMMARY OF THE INVENTION

In accordance with an illustrative embodiment demonstrating features and advantages of the present invention, there is provided in a tank having an internal float and a standpipe, a means for controlling the level of liquid in the tank. The standpipe is coupled through the tank and is operable to conduct liquid into the tank. The means for controlling the level of liquid includes a valve operative to open in response to downward movement of the float. Also included is a conduit depending from the valve for conducting liquid to the valve. The conduit has a length exceeding that of the valve. The means for controlling the level of liquid also includes a pliable seal mounted upon and engaging an inside surface of the conduit. The seal is located at the end of the conduit opposite to that of the valve. The pliable seal has a bore sized to encircle and seal the standpipe. Thus the standpipe may telescope into the conduit.

BRIEF DESCRIPTION OF THE DRAWINGS

The above brief description as well as further objects, features and advantages of the present invention will be more fully appreciated by reference to the following detail description of a presently preferred but nonetheless illustrative embodiment in accordance with the present invention, when taken in connection with the accompanying drawings wherein.

DETAILED DESCRIPTION OF THE PREFERRED EMBODIMENT

Figure 1:
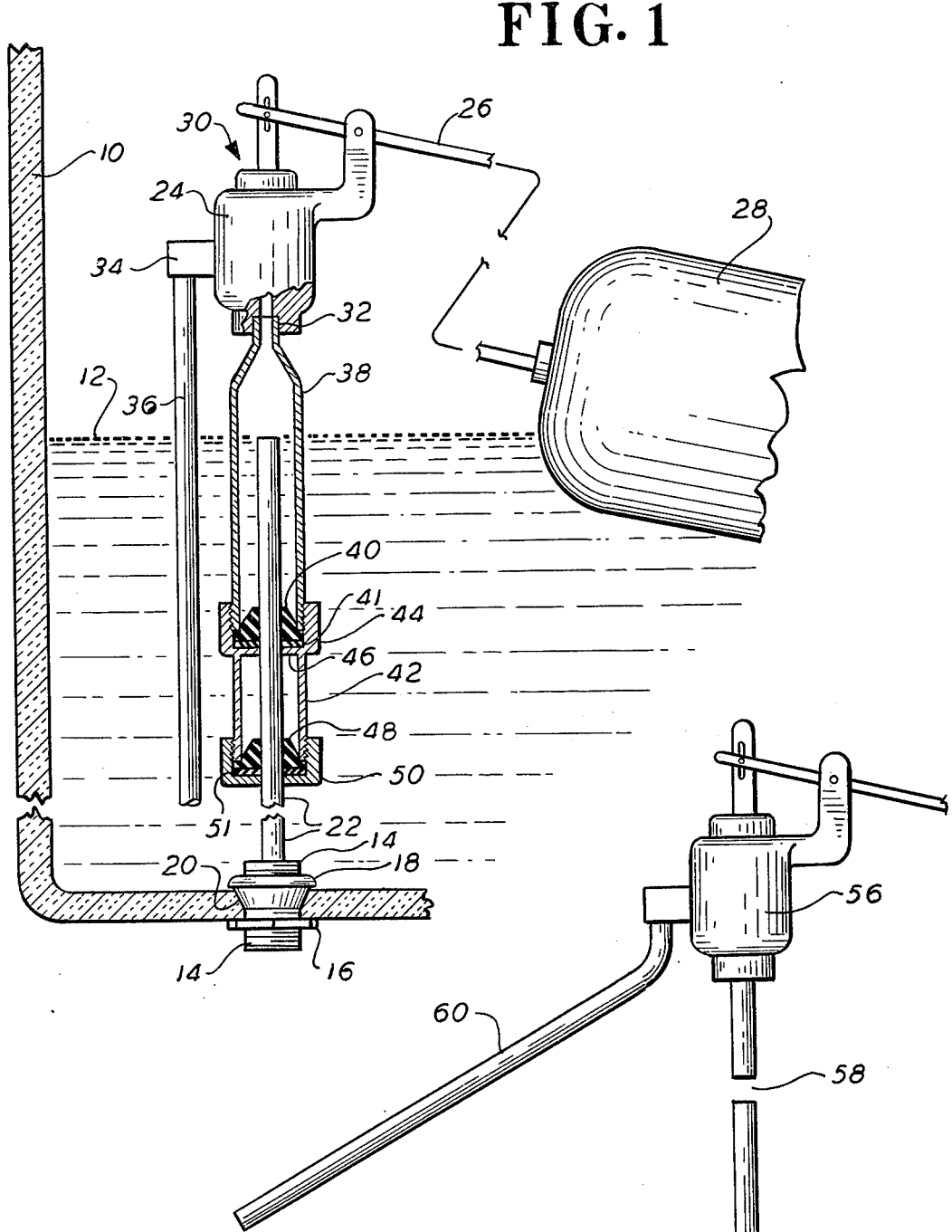
FIG. 1 is an elevational view, partly in section, of apparatus according to the instant invention.

Referring to FIG. 1 there is shown a sectional view of tank 10 which has been broken at the upper left and lower right for illustrative purposes. Tank 10 is constructed of a frangible material such as china. Tank 10 is shown partially filled with water to the level 12. Piercing the bottom of tank 10 is externally threaded, annular shank 14. Threaded onto shank 14 is external nut 16 and internal fixture 18. Compressed between fixture 18 and tank 10 is annular gasket 20, which has a frustro-conical outer surface. By threading together fixture 18 and nut 16, gasket 20 is sealed to tank 10.

Mounted on shank 14 is standpipe 22. Standpipe 22 and shank 14 are arranged so that a water supply pipe can be threaded onto the bottom portion of shank 14, thereby supplying water into standpipe 22.

A valve is shown herein as ballcock valve 24, having linked to it lever arm 26. At the end of arm 26 opposite valve 24 is ball-shaped float 28. Valve 24 is shown having linkage apparatus 30 coupled to lever arm 26. It is to be appreciated, however, that various alternate valve arrangements are known in the art which may be substituted for valve 24. The inlet to valve 24 is port 32. Valve 24 has outlet port 34 from which depends a fill tube 36. Valve 24 operates such that downward articulation of lever arm 26 causes valve 24 to open so that water can communicate between port 32 and fill tube 36.

A conduit is shown herein as pipe 38 which depends from port 32 of valve 24. While conduit 38 is shown as a pipe having a converging upper end and an externally threaded lower end, it is appreciated that other shapes and threading arrangements are possible.

A pliable seal is shown herein as a rubber annulus 40 having a frustro-conical outer surface and coaxial cylindrical bore. It is to be noted that the outside diameter of seal 40 exceeds the inside diameter of conduit 38. Also, the inside diameter of the axial bore of seal 40 is sized to encircle and seal standpipe 22. Metal washer 41 underlies annulus 40.

A barrel is shown herein as cylindrical sleeve 42. Sleeve 42 has a thickened shoulder 44 whose surfaces are flattened into a hexnut arrangement for rotating sleeve 42. Sleeve 42 also has a transverse, internal annular wall 46 whose inside diameter corresponds to that of seal 40. The inside surface of sleeve 42 above wall 46 is internally threaded. Arranged in this fashion, sleeve 42 may be threaded onto conduit 38 thereby compressing pliable seal 40 onto standpipe 22 and conduit 38.

While the barrel provided by sleeve 42 operates satisfactorily, it is anticipated that other shapes may be employed in alternate embodiments. In addition, these alternates may employ different threading on different barrel surfaces. Furthermore, they may be sized to accommodate various diameters of standpipes.

A pliable gasket is shown herein as a lower rubber annulus 48, which has a frustro-conical outer surface and a coaxial cylindrical bore. It is to be observed that the bores of seal 40 and gasket 48 are in vertical alignment. The outside diameter of gasket 48 exceeds the inside diameter of barrel 42 at its lower extremity. An internally threaded annulus is shown herein as compression nut 50 which threads onto lower external threads on barrel 42. Arranged in this fashion nut 50 compresses gasket 48 onto barrel 42 and standpipe 22 through metal washer 51.

Figure 2:
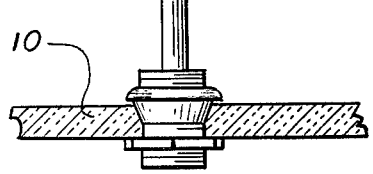
FIG. 2 is an elevational view showing severing of a conventional standpipe.

The preferred method of installing the foregoing valve and conduit will now be briefly described. Referring to FIG. 2, there is shown worn ballcock valve 56. Ballcock valve 56 has been removed from standpipe 22 by severing standpipe 22 with a pipe cutter, hacksaw or similar tool at breach 58. Severance of the ballcock 56 can be facilated by outwardly bending fill tube 60 to provide working room. It is to be noted that in this condition, the hardware associated with the joint of standpipe 22 and tank 10 (same reference numerals as previously used in connection with FIG. 1) is undisturbed.

Referring to FIG. 1, a replacement valve is mounted by slipping nut 50, gasket 48, barrel 42, seal 40 and conduit 38 over standpipe 22 in that order. It is preferred that conduit 38 be pre-installed to valve 24 at the time of manufacture. Next, the height of valve 24 is set to provide the desired level of water in tank 10. After setting, seal 40 is moved upwardly against the lower surface of conduit 38 and compressed into position by threading barrel 42 onto conduit 38. In a similar fashion, gasket 48 is moved upward onto the lower end of barrel 42 and is compressed thereon by threading nut 50 onto the lower external threads of barrel 42.

Assembled in this manner the apparatus of FIG. 1 operates in the following fashion:

Assume that tank 10 has been recently emptied. Accordingly, float 28 by virtue of its weight causes lever arm 26 to articulate downwardly. Consequently, valve 24 opens and a supply of water is conducted through shank 14 standpipe 22 and conduit 38 into valve 24 and out through port 34 and fill tube 36. Accordingly, the level of water in tank 10 rises and eventually intercepts and buoys float 28. In response, float 28 rises and rotates lever arm 26 upwardly (counter-clockwise). Eventually lever arm 26 rotates sufficiently to cause linkage 30 to close valve 24. At this present level of water, valve 24 closes. Thus valve 24 operates to maintain the level of water in tank 10 at a predetermined height.

As previously mentioned, the foregoing apparatus may be constructed in alternate fashions using equipment and plumbing of various shapes. In addition, it is expected that numerous materials may be used to fabricate the foregoing components including metals, plastics etc. Accordingly, the various thicknesses, tolerances, weights etc. may be varied to provide the desired capacity, strength, etc. Thus, a latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim:

1. In a tank having an internal float and a standpipe coupled to the bottom wall of said tank for conducting liquid into said tank, a means for controlling the level of liquid in said tank comprising:
   a valve operative to open in response to downward movement of said float;
   a conduit depending being attached to said valve and conduit conducts liquid to said valve downwardly therefrom, said conduit having a length exceeding that of said valve, said conduit being sized to telescope over said standpipe; said conduit being slidably adjustable along said stand pipe for adjusting the level of the liquid within said tank, an upper portion of said standpipe is positioned within said conduit and spaced from said valve; and
   a pliable seal mounted upon and engaging an interior surface of said conduit at an end thereof opposite to that of said valve, said pliable seal having a bore sized to encircle and seal said standpipe, said conduit and pliable seal being operable to connect between said valve and said standpipe, whereby said standpipe may telescope into said conduit.

2. In a tank according to claim 1 wherein the inside diameter of said conduit exceeds the inside diameter of said bore in said seal.

3. In a tank according to claim 2 further including:
   a barrel depending from said conduit; and
   a pliable gasket mounted on said barrel at an end thereof opposite to that of said conduit, said gasket having an aperture sized to encircle and seal said standpipe, said aperture being aligned with said bore of said seal.

4. In a tank according to claim 3 wherein said barrel is externally threaded at the end adjacent to said gasket and wherein said means for controlling further includes:
   an internally threaded annulus threaded onto said barrel to compress said gasket against said barrel and said standpipe.

5. In a tank according to claim 4 wherein said barrel has an annular wall coaxially located within said barrel, said wall being transverse to the longitudinal axis of said barrel, said wall having an inside diameter corresponding that of said bore of said seal.

6. In a tank according to claim 5 wherein a portion of the outside surface of said seal is frustro-conical, the outside diameter of said seal exceeding that of said conduit.

7. A method for replacing a worn ballcock valve mounted on a standpole within a tank with another ballcock valve having depending therefrom a conduit having an inside diameter exceeding the outside diameter of said standpipe, said conduit having a pliable seal, comprising the steps of:
   severing said standpipe at a location near said worn ballcock;
   vertically and adjustably positioning said another valve over said severed standpipe, said conduit being positioned and sized to telescope over said standpipe and wherein said pliable seal is operable to seal and attach said conduit to said standpipe at various positions thereon; and
   sealing said conduit with said pliable seal to said standpipe to support above it said valve and said conduit.

8. A method according to claim 7, wherein said method further including the step of:
   adjusting the vertical position of said conduit and valve prior to sealing said conduit to said standpipe, whereby the level to which fluid must fill said tank to close said valve is adjustable.

* * * * *

UNITED STATES PATENT AND TRADEMARK OFFICE
CERTIFICATE OF CORRECTION

PATENT NO. : 4,258,737
DATED : March 31, 1981
INVENTOR(S) : Francis John Wheeler It is certified that error appears in the above—identified patent and that said Letters Patent is hereby corrected as shown below:

Column 4, line 7, delete "depending".

Column 4, line 7, insert after "and"
-- depending downwardly --.

Column 4, delete line 8.
Column 4, line 9, after "therefrom", insert

-- said conduit conducts liquid to said valve, --.

Column 4, line 47, "standpole" should read -- standpipe --.

Signed and Sealed this

Ninth Day of June 1981

[SEAL]

Attest:

RENE D. TEGTMEYER

Attesting Officer

Acting Commissioner of Patents and Trademarks